3,467,692
FLUOROPHENOXY ALKYL NITRILES
Peter E. Newallis, Morris Plains, and Edmund J. Rumanowski, Dover, N.J., assignors to Allied Chemical Corporation, New York, N.Y., a corporation of New York
No Drawing. Filed May 12, 1965, Ser. No. 455,321
Int. Cl. C07c *121/52*
U.S. Cl. 260—465                                            6 Claims

ABSTRACT OF THE DISCLOSURE

Fluorophenoxy alkyl nitriles having the general formula

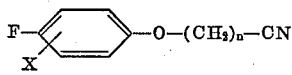

wherein X is H, F or Cl, and $n$ is a whole number from 1 to 3, are herbicides.

---

This invention relates to new fluorophenoxy alkyl nitriles, to new herbicidal compositions containing them, and to a method for controlling or killing weeds therewith.

The new compounds of our invention have the formula shown below

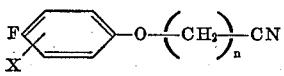

wherein X may be hydrogen, fluorine or chlorine, and $n$ is an integer from 1 to 3 inclusive.

It has been proposed in the past to use chlorine-substituted phenoxy alkyl nitriles as herbicidal compositions. These chloro-substituted compounds, while possessing high phytotoxicity to certain broad-leaf weeds such as rape, exert only very low toxicity for the common weed grasses such that they fail to control these grassy pests when used in amounts small enough to be economically attractive.

We have found, on the other hand, that fluorine-substituted phenoxy alkyl nitriles of our invention, wherein a fluorine is in the para of 4 position on the phenyl ring, are unusually effective herbicides useful for controlling not only the broad-leaf weeds, but also effective for controlling the more resistant grasses such as Johnson grass and wild oats. Especially effective are the para fluorophenoxy compounds which have a second halogen substituent in the benzene ring such as 2-chloro-4-fluorophenoxyacetonitrile and 2-chloro-4-fluorophenoxybutyronitrile.

The fluorophenoxy alkyl nitriles useful in controlling and killing weeds according to our invention may be prepared by reacting the appropriate fluorophenol with a chloronitrile in the presence of an alkaline-condensing agent such as an alkali metal carbonate according to the equation:

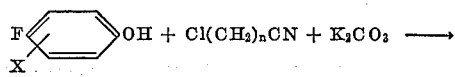
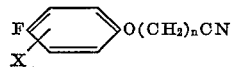

The reaction is preferably carried out in a liquid reaction medium such as, for example, 1,2-dimethoxyethane or anhydrous acetone by adding anhydrous potassium carbonate to a mixture of the appropriate phenol and nitrile dispersed in the reaction medium, and refluxing, for say, one to three hours. The resulting nitrile may then be separated by diluting the reaction mixture with water, and recovering the oil that separates, as by taking it up in a solvent such as methylene chloride, washing with alkali and water, followed by drying and vacuum distilling if desired.

The fluorophenoxy alkyl compounds of our invention are active non-selective herbicides excellent for use in eradicating noxious grasses and broad-leaf weeds.

Compounds coming within the scope of our invention include 4-fluorophenoxyacetonitrile; 2-chloro-4-fluorophenoxyacetonitrile; 2,4-difluorophenoxyacetonitrile; 4-fluorophenoxypropionitrile; 4 - fluorophenoxybutyronitrile; 2-chloro-4-fluorophenoxybutyronitrile; and 2,4-difluorophenoxybutyronitrile.

The fluorophenoxy alkyl nitrile compounds are effective against weeds when applied at dosages of a few pounds of the substance per acre. They may be applied in any convenient manner, either incorporated in large quantities of solvents or non-solvent solid or liquid diluents as carriers. For example, the active substance may be dissolved in a small quantity of active solvent which is insoluble in water, and then this solution may be mixed with a large quantity of water with the addition of emulsifying agents and other adjuvants. The active substances may also be applied as dusts or granules, or as dispersions of wettable powders in water. The preparations may be applied to the soil before, during or after germination of the weeds. They are especially effective pre-emergence herbicides.

The following specific examples further illustrate our invention. Parts are by weight except as otherwise noted.

EXAMPLE 1

Preparation of 2-chloro-4-fluorophenoxyacetonitrile

Into a 250 ml. 3-necked flask fitted with thermometer, stirrer and condenser was charged 29.3 grams (0.2 mol) 2-chloro-4-fluorophenol, 15.1 grams (0.2 mol) chloroacetonitrile and 150 ml. of 1,2-dimethoxyethane. After heating to 55°–60° C., 27.6 grams (0.2 mol) of anhydrous $K_2CO_3$ was introduced portion-wise in 3–5 minutes, and the whole refluxed for 1½ hours.

The reaction mass was diluted 3–4 times its volume with water and oil separated. The oil was dissolved in about 100 ml. $CH_2Cl_2$, dried with anhydrous $MgSO_4$ and filtered. On vacuum distillation there is obtained 29 grams of liquid with a boiling point at 3 mm. Hg pressure of 113–114° C., for a yield of 80%. The product is an excellent herbicide.

Theory (percent): C, 51.8; H, 2.70. Found (percent): C, 51.9; H, 2.86.

EXAMPLE 2

Preparation of 4-fluorophenoxyacetonitrile

Into a 250 ml. 3-necked flask was placed 23.6 grams (.3 mol) of parafluorophenol and 22.7 grams (.3 mol) of chloroacetonitrile. This was heated to 55° to 60° C., and 41.5 grams (.3 mol) of anhydrous potassium carbonate was added in 3 minutes, and the whole heated at reflux for 2 hours. The solvent was 150 ml. of 1,2-dimethoxyethane. This was cooled and diluted with 3 to 4 times its volume with water. Four grams of sodium hydroxide in 20 ml. of water was added. The organic layer was separated in a separatory funnel, dried with calcium sulfate and vacuum distilled to give a fraction which boiled at 1 mm. Hg pressure at 90 to 100° C. This weighed 25.5 grams. Redistillation gave 20 grams of product boiling point 85–90 (0.75 mm. Hg pressure). On standing this solidified to give a solid of melting point 35 to 36° C. This solid was 4-fluorophenoxyacetonitrile.

EXAMPLE 3

Preparation of 2-chloro-4-fluorophenoxybutyronitrile

Into a three-neck flask equipped with condenser, stirrer, thermometer and addition funnel was charged 29.3 grams (0.2 mol) of 2-chloro-4-fluorophenol and 100 ml. of diethylene glycol dimethyl ether. Then 11.3 grams (0.21 mol) of sodium methoxide was added with vigorous stirring. After heating the reactants to 70°–80° C., 29.6 grams (0.2 mol) of γ bromobutyronitrile in 25 ml. of diethylene glycol dimethyl ether was added in 10–15 minutes. The reactants were then heated at 80–90° C. for 1½ hours.

Diluting the reaction with 3–4 times its volume with water produced an oil which was separated and the water layer extracted 2 times with 100 ml. $CH_2Cl_2$. The combined organic portions were then successively washed with 5% $NaOH-H_2O$, water alone and dried with $MgSO_4$.

On vacuum distillation, the cut with B.P. at 0.1 mm. of 120°–135° C. was collected and redistilled. There was obtained 17.5 grams of oil with B.P. at 0.1 mm. of 125°–131° C. for a yield of 40% of 2-chloro-4-fluorophenoxybutyronitrile.

Theory (percent): Cl, 16.6. Found (percent) Cl, 16.5.

EXAMPLE 4

Preparation of 4-fluorophenoxybutyronitrile

Into a three-neck flask was charged the following as described in Example 3 above: 22.4 grams (0.2 mol) of p-fluorophenol; 100 ml. of diethylene glycol dimethyl ether; 11.3 grams (0.21 mol) of sodium methoxide; and 29.6 grams (0.2 mol) of γ bromobutyronitrile.

After refluxing for 1½ hours and treating the reaction as in Example 3, there was obtained on vacuum distillation 22 grams of an oil with a B.P. at 0.1 mm. of 115°–121° C. for a 61% yield of 4-fluorophenoxybutyronitrile.

EXAMPLE 5

Three fluorophenoxyacetonitriles listed below were tested for pre-emergence herbicidal activity against the common weeds, ryegrass (*Lolium multiflorum*), crabgrass (*Digitaria sanguinalis*) and Johnson grass (*Sorghum halepense*).

In these tests, the weed seeds were uniformly broadcast seeded in separate flats and covered with soil. The flats were then uniformly watered. Within one day after seeding, two flats of each seed variety were sprayed with a solution of each toxicant in acetone, at rates of 80 gallons of solution per acre, equivalent to 16 pounds of active toxicant per acre. Treated flats were placed in a greenhouse, watered with subirrigation and held for a 16-day observation period, after which they were rated on an "Injury rating" scale (IR) of 1 to 10, in which 0 means no apparent injury; 1, 2, 3 slight injury; 4, 5, 6 moderate injury; 7, 8, 9 severe injury; and 10, plants dead. Plant mortality was also determined on a percentage basis, i.e., percent PK, as compared to plots similarly prepared and held, but untreated with toxicant. The compounds of the invention are listed below:

(A) 2-chloro-4-fluorophenoxyacetonitrile
(B) 2-chloro-4-fluorophenoxybutyronitrile
(C) 4-fluorophenoxybutyronitrile Results of the tests are shown in Table I below, the respective compounds being listed by the letters (A), (B), or (C) shown above.

Included for comparative purposes are the corresponding chlorine analogs listed as (X), (Y), and (Z), respectively, as identified below, illustrating the inferiority of these chlorine-containing compounds to the fluorine-containing compounds of the invention.

(X) 2,4-dichlorophenoxyacetonitrile
(Y) 2,4-dichlorophenoxybutyronitrile
(Z) 4-chlorophenoxybutyronitrile

TABLE I

| Weed | Dosage at 16 lbs./acre | | | | | |
|---|---|---|---|---|---|---|
| | A | X | B | Y | C | Z |
| Ryegrass: | | | | | | |
| IR | 10 | 9 | 9 | 0 | 9 | 6 |
| Percent PK | 100 | 90 | 98 | 0 | 95 | 60 |
| Crabgrass: | | | | | | |
| IR | 10 | 9 | 10 | 7 | 10 | 8 |
| Percent PK | 100 | 90 | 100 | 70 | 100 | 80 |
| Johnson grass: | | | | | | |
| IR | 10 | 6 | 10 | 3 | 10 | 2 |
| Percent PK | 100 | 60 | 100 | 30 | 100 | 20 |

It will be noted from Table I that the three fluorophenoxyalkyl nitriles, (A), (B), and (C) all gave complete control of the test weeds, including Johnson grass and crabgrass, whereas the corresponding chlorine analogs, (X), (Y), and (Z) all gave inferior control of these grasses.

EXAMPLE 6

The compounds (A), (B), and (C) were tested in the same manner as described in Example 5 above, in comparison with their chlorine analogs, (X), (Y), and (Z), except that dosages of only 2 pounds of toxicant per acre were applied instead of 16, on flats seeded with ryegrass and crabgrass. 2-chloro-4-fluorophenoxyacetonitrile (A) and its chlorine counterpart 2,3-dichlorophenoxyacetonitrile (X), were tested against Johnson grass and wild oats. Results of these tests are shown in Table II below:

TABLE II

| Weed | Dosage at 2 lbs./acre | | | | | |
|---|---|---|---|---|---|---|
| | A | X | B | Y | C | Z |
| Ryegrass: | | | | | | |
| IR | 9 | 4 | 3 | 0 | 3 | 0 |
| Percent PK | 95 | 40 | 30 | 0 | 30 | 0 |
| Crabgrass: | | | | | | |
| IR | 9 | 5 | 7 | 0 | 5 | 0 |
| Percent PK | 90 | 50 | 70 | 0 | 50 | 0 |
| Johnson grass: | | | | | | |
| IR | 8 | 4 | | | | |
| Percent PK | 80 | 40 | | | | |
| Wild oats: | | | | | | |
| IR | 5 | 0 | | | | |
| Percent PK | 50 | 0 | | | | |

It will be noted from Table II that even at these extremely low dosages, the 2-chloro-4-fluorophenoxyacetonitrile (A), the 2-chloro-4-fluorophenoxybutyronitrile (B) and the 4-fluorophenoxybutyronitrile (C) exert substantial control of crabgrass. The 2-chloro-4-fluorophenoxyacetonitrile (A), in addition to its excellent control of crabgrass, substantially completely controls both ryegrass and Johnson grass and exhibits appreciable control over the hard-to-control wild oats, whereas the corresponding chloro-analog (X) is completely ineffective against these grasses as this concentration.

We claim:

1. Fluorophenoxyalkylnitriles of the formula

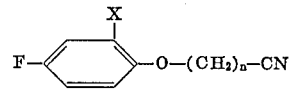

wherein X is a member selected from the group consisting of hydrogen, chlorine and fluorine, and *n* is an integer from 1 to 3 inclusive.

2. Fluorophenoxyalkylnitriles according to claim 1, having the formula

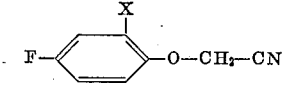

3. 2-chloro-4-fluorophenoxyacetonitrile.
4. Fluorophenoxyalkylnitriles according to claim 1 having the formula
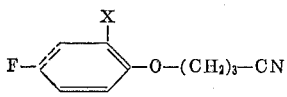
5. 2-chloro-4-fluorophenoxybutyronitrile.
6. 4-fluorophenoxybutyronitrile.
References Cited
UNITED STATES PATENTS
| | | | |
|---|---|---|---|
| 2,472,347 | 6/1949 | Sexton | 260—465 XR |
| 2,863,754 | 12/1958 | Wain | 71—105 |
| 2,974,160 | 3/1961 | Heininger | 260—465 XR |
CHARLES B. PARKER, Primary Examiner
D. H. TORRENCE, Assistant Examiner
U.S. Cl. X.R.
71—105